(12) United States Patent
Miller et al.

(10) Patent No.: US 8,297,157 B1
(45) Date of Patent: Oct. 30, 2012

(54) PORTABLE BEVELING TOOL

(75) Inventors: Kevin S. Miller, Dillsburg, PA (US);
David G. Kampel, Chapel Hill, NC (US)

(73) Assignee: TKM Tools, Inc., Dillsburg, PA (US)

( * ) Notice: Subject to any disclaimer, the term of this patent is extended or adjusted under 35 U.S.C. 154(b) by 1184 days.

(21) Appl. No.: 12/131,971

(22) Filed: Jun. 3, 2008

Related U.S. Application Data

(60) Provisional application No. 60/955,045, filed on Aug. 10, 2007.

(51) Int. Cl.
*B23C 1/20* (2006.01)
*B23C 3/12* (2006.01)
*B23B 5/16* (2006.01)

(52) U.S. Cl. ............... 82/113; 408/211; 409/179

(58) Field of Classification Search ............ 82/113; 408/211; 409/178–180
See application file for complete search history.

(56) References Cited

U.S. PATENT DOCUMENTS

| | | | | |
|---|---|---|---|---|
| 1,724,005 A * | 8/1929 | Christensen | ................. | 408/201 |
| 2,009,168 A * | 7/1935 | Dettmer | ................... | 408/201 |
| 3,028,772 A * | 4/1962 | Mossberg | ................. | 408/59 |
| 3,164,062 A * | 1/1965 | Hogden et al. | ............... | 409/179 |
| 3,699,828 A | 10/1972 | Platek et al. | | |
| 3,712,174 A | 1/1973 | Granfield | | |
| 3,733,939 A * | 5/1973 | Paysinger et al. | ............... | 82/113 |
| 3,817,649 A * | 6/1974 | Medney | ................... | 408/211 |
| 4,180,358 A | 12/1979 | Uribe | | |
| 4,207,786 A * | 6/1980 | Astle et al. | ................... | 82/113 |
| 5,641,253 A | 6/1997 | Wagner | | |
| 5,782,030 A * | 7/1998 | French | .................. | 42/76.01 |
| 6,146,067 A | 11/2000 | Owens | | |
| 7,103,950 B1 * | 9/2006 | Scheffer | ................. | 29/33 T |
| 2004/0206218 A1 | 10/2004 | Nybo | | |

* cited by examiner

*Primary Examiner* — Boyer D Ashley
*Assistant Examiner* — Sara Addisu
(74) *Attorney, Agent, or Firm* — Hooker & Habib, P.C.

(57) ABSTRACT

A portable beveling tool that is attached to a power tool having a rotary cutter for beveling pipe. The beveling tool includes a base, two rollers extending away from the base, and a tool mount that rotatably mounts the power tool to the base. The rollers and the cutter cooperate to locate the beveling tool on the pipe and to guide movement of the beveling tool around the pipe. The position of one of the rollers is adjustable to accommodate pipes of different diameters and wall thicknesses. An operator can move the beveling tool around the end of the pipe without changing his or her grip on the power tool.

13 Claims, 3 Drawing Sheets

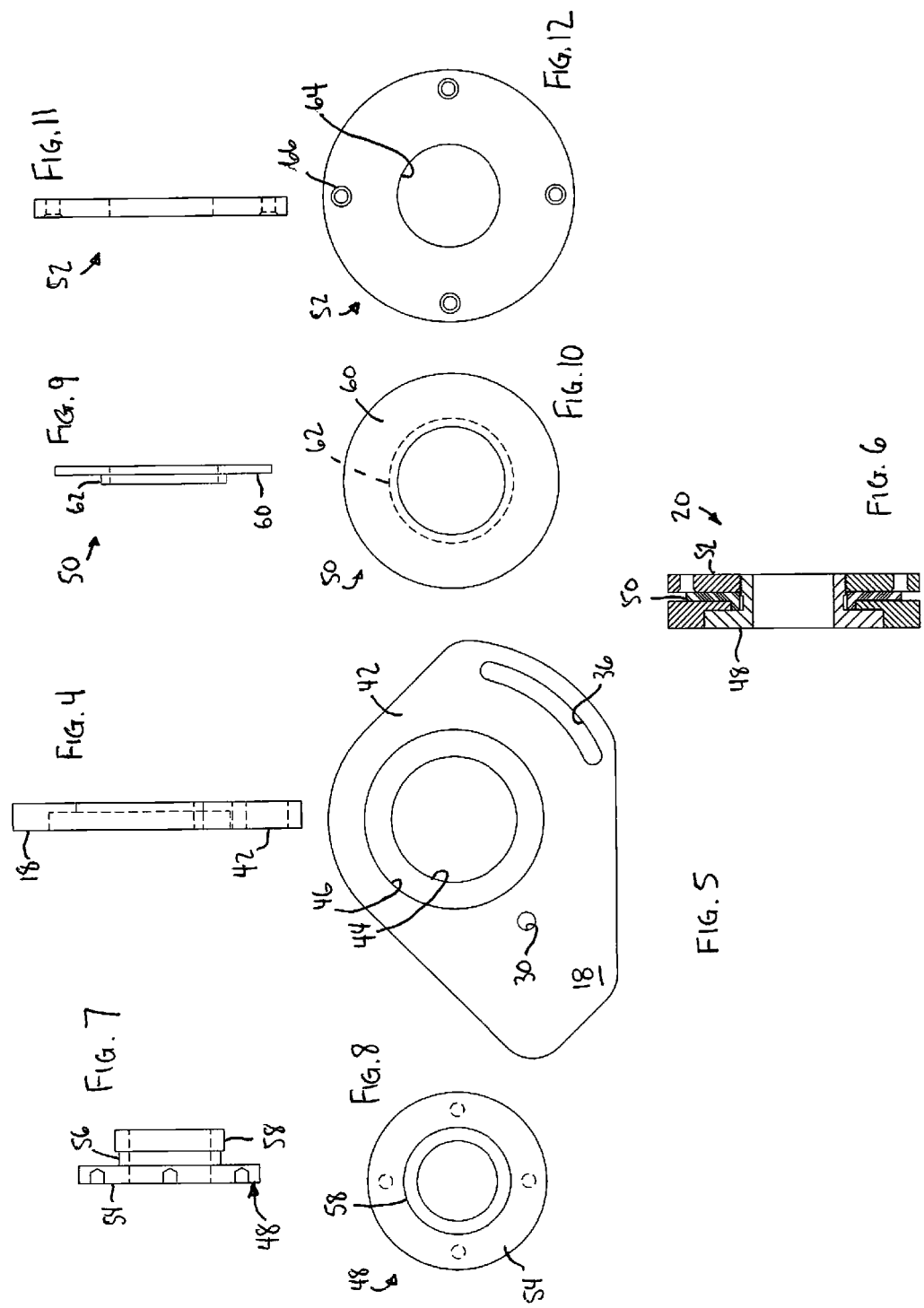

PORTABLE BEVELING TOOL

This application claims the benefit of our pending U.S. provisional patent App. No. 60/955,045 filed Aug. 10, 2007, which provisional application is incorporated by reference as if fully set forth herein.

FIELD OF THE INVENTION

The present invention relates to tools for beveling pipe, and in particular to tools intended for attachment to a power tool that drives a cutter that bevels the pipe.

BACKGROUND OF THE INVENTION

The portable beveling tool of the present invention was developed for use by excavators and contractors when installing plastic sewer and drainage pipe. An example of such pipe is SDR 35 PVC (Poly Vinyl Chloride) Sewer and Drainage Pipe.

Lengths of SDR 35 PVC Sewer and Drainage Pipe are manufactured with a bell end and a spigot end, with the spigot end including a bevel. The bell end of the pipe has a neoprene/rubber seal inside the periphery of the bell. When the pipe is installed in the field, the beveled spigot end is inserted into the bell end of the preceding pipe. The bevel allows for proper assembly of the pipe lengths and eliminates tearing or disturbing the neoprene/rubber seal.

The integrity of the seal must be maintained as each length of pipe is assembled. This seal is critical as the integrity of each pipe joint is tested after assembly with air pressure.

When a standard length of pipe is cut to a specific length, the cut end of the pipe no longer has the factory-beveled end. The pipe must have the correct bevel cut each time a standard length pipe is cut to size to maintain the integrity of the seal.

Portable tools have been developed to bevel the end of a pipe with a power tool carrying a cutter. Uribe, U.S. Pat. No. 4,180,358 and Nybo, US Published Patent Application No. 2004/0206218 each disclose a pipe beveling tool that attaches to a power tool such as a drill, router, or the like. The beveling tool includes a datum plate that attaches to the power tool. The plate has a through-hole or aperture that enables a cutter carried by the power tool to extend through the beveling tool and cut the bevel.

The plate is placed against the end of the pipe, and at least three rollers mounted on the plate locate the beveling tool on the end of the pipe. The rollers abut the inner or outer pipe walls, allowing the pipe to rotate and enabling the cutter to cut a bevel around the entire circumference of the pipe.

Although the above beveling tools are useful, there is room for improvement in both the initial cost of the beveling tool and operator convenience when using the beveling tool.

Simplifying construction would reduce the number of components, thereby reducing cost.

A more ergonomic design of the beveling tool would increase operator convenience and improve the quality of the bevels made by the beveling tool.

When beveling a pipe in place that cannot rotate, the beveling tool itself must instead revolve around the pipe. The handle of the power tool is used to move the beveling tool around the pipe. The beveling tool and its attached power tool must each make one complete rotation with a complete revolution around the pipe, which can cause the operator to change his or her grip on the handle as the bevel is being cut.

Changing grip while the bevel is being cut can affect the quality and accuracy of the resulting bevel. If the operator could maintain the same grip on the power tool as the beveling tool moves around the periphery of the pipe, operator convenience as well as bevel quality and accuracy increases.

Thus there is a need for a beveling tool having a simpler construction and a more ergonomic design.

BRIEF SUMMARY OF THE INVENTION

The invention is an improved portable beveling tool that includes a simplified construction to locate the beveling tool on the end of a pipe and an ergonomic design for attaching a power tool to the beveling tool. The simplified construction helps minimize the cost of the beveling tool, while the ergonomic design enables the operator to maintain the same grip on the power tool as the beveling tool moves around the periphery of the pipe.

The simplified construction results from the beveling tool having only two rollers that each extend along a respective axis of rotation. The power tool is attached to the beveling tool with the cutter extending along a third axis spaced from the first and second axes. The two rollers and the cutter cooperate to locate and guide the beveling tool around the end of the pipe.

The beveling tool is ergonomically designed and includes a tool mount friction swivel that rotatably attaches the power tool to the beveling tool. The power tool is free to rotate or pivot about the cutter axis with respect to the beveling tool. This enables the operator to maintain the same grip on the power tool as the beveling tool moves around the periphery of the pipe when cutting the bevel.

The portable beveling tool of the present invention includes a plate or base having a datum surface that rides on the pipe end perpendicular to the longitudinal axis of the pipe. The datum surface is preferably machined from flat aluminum plate. The first and second guide rollers are attached to the base and extend on a perpendicular line from one side of the base. The first roller is attached to the plate for rotation about a fixed first axis and the second roller rotates about a second axis spaced from the first axis. The second roller is preferably adjustable and mounted to the plate for locating the second axis with respect to the first axis. This enables the operator to selectively adjust the position of the second roller for different diameters or wall thicknesses of pipe.

The plate includes an opening that extends through the plate and a tool mount that attaches the power tool onto the other side of the plate. The tool mount locates the power tool with the cutter extending along the third axis. The cutter extends through the opening and extends away from the one side of the base.

The power tool is preferably a router or rotary trimmer that holds a cutter having an angled cutting edge shaped to cut the bevel. The cutter preferably includes a pilot roller or pilot bearing that cooperates with the other two rollers to locate the beveling tool on the pipe. The beveling tool also preferably includes a clear Lexan shield to protect the operator from the shavings coming off the cutter.

The tool mount preferably rotatably mounts the power tool on the base for rotation about the third axis.

The portable beveling tool of the present invention has fewer rollers than conventional beveling tools to reduce cost and to simplify adjusting the beveling tool for different pipe diameters. The portable beveling tool also enables the operator to maintain the same grip on the power tool as the beveling tool moves around a pipe, increasing operator comfort and improving the quality and accuracy of the bevels.

Other objects and features of the present invention will become apparent as the description proceeds, especially when taken in conjunction with the accompanying three drawing sheets illustrating an embodiment of the invention.

BRIEF DESCRIPTION OF THE DRAWINGS

FIGS. 4 and 5 are side and front views respectively of the baseplate of the portable beveling tool;

FIG. 6 is a sectional view similar to FIG. 2 but illustrating only the friction swivel assembly;

FIGS. 7 and 8 are side and front views of the retaining nut of the friction swivel assembly;

FIGS. 9 and 10 are side and front views of the spacer of the friction swivel assembly;

FIGS. 11 and 12 are side and front views of the attachment plate of the friction swivel assembly.

DESCRIPTION OF THE PREFERRED EMBODIMENT

Figure 2:
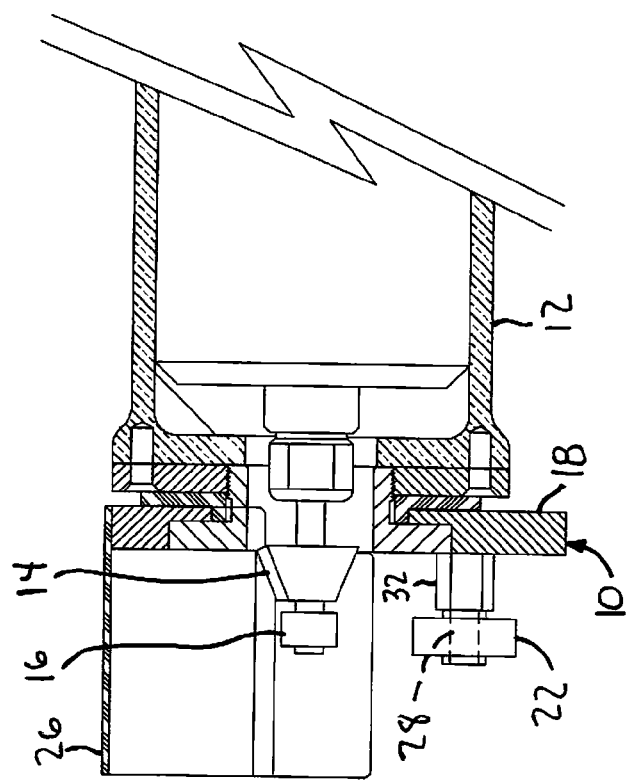
FIG. 2 is a sectional view taken along line A-A with the portable beveling tool attached to a router.
Figure 1:
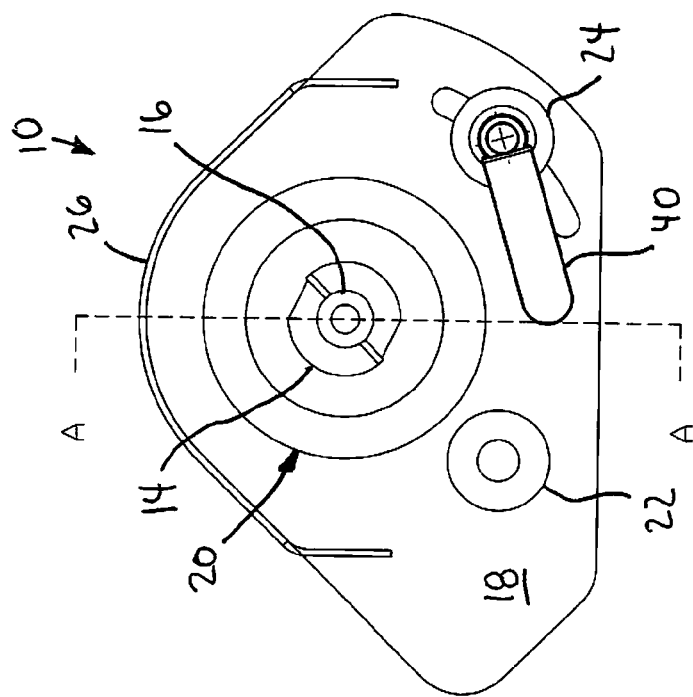
FIG. 1 is a front view of a portable beveling tool in accordance with the present invention.
Figure 3:
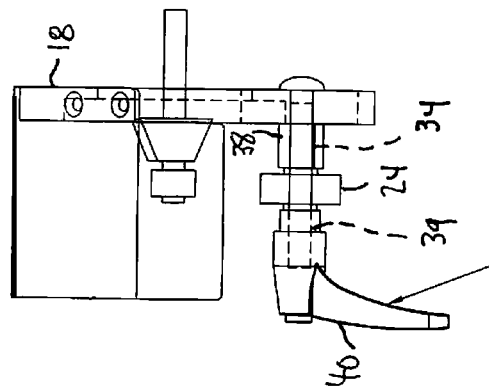
FIG. 3 is a side view of the portable beveling tool.

FIGS. 1-12 illustrate a portable beveling tool 10 in accordance with the present invention. Beveling tool 10 is shown in FIGS. 1 and 2 attached to a power tool 12 that carries a rotary cutter 14. In the illustrated embodiment tool 12 is a router or rotary trimmer 12. Trimmer 12 can be a Ryobi P600 cordless trimmer or equivalent. The illustrated cutter 14 is a conventional carbide-tipped piloted router bit 14 that cuts the pipe bevel. Router bit 14 includes a pilot bearing or pilot roller 16 that locates the router bit 14 against the object to be cut by the bit. Router bit 14 can be a WOODTEK Catalog No. 115-571 router bit or equivalent, or can be a bit specifically designed for the portable beveling tool 10.

Beveling tool 10 includes a base machined as a flat baseplate 18, and a friction swivel assembly 20 that mounts the router 12 to the baseplate 18. A fixed guide roller 22 and an adjustable guide roller 24 are located on one side of the baseplate 18. Guide rollers 22, 24 can each be a Fafnir KP4 FS428 MS27640-AG bearing or equivalent. A clear plastic Lexan shield 26 is attached to an outer peripheral edge of the baseplate by screws (see FIG. 13) and extends outwardly beyond the guide rollers 22, 24.

Fixed guide roller 22 is attached to a shaft 28 that extends through a closely-sized circular hole 30 in the baseplate 18. A bushing 32 carried on the shaft 28 spaces the guide roller 22 from the one side of the baseplate 18.

Adjustable guide roller 24 is attached to a shaft 34 that extends through an elongate, arcuate slot 36 in the baseplate 18. A bushing 38, like bushing 32, spaces the guide roller 24 from the one side of the baseplate 18. Shaft 34 is preferably a carriage bolt that includes a threaded shaft portion 39 that extends beyond the guide roller 24. An adjustable handle 40 is threaded on the end of the shaft portion 39. Handle 40 can be a Reid Supply Company Part No. JCL-303 handle or equivalent. The handle 40 acts as a clamping lever that is tightened to clamp the shaft 34 against the baseplate 18 and hold the shaft 34 at a selected position along the slot 36, or released and loosened to enable the shaft 34 to be repositioned along the slot 36.

Baseplate 18 is machined from aluminum plate and includes a flat datum surface 42 on the one side of the baseplate that locates an end of a pipe to be beveled. A central circular through hole or opening 44 having a counterbore 46 on the one side of the baseplate is located between the baseplate hole 30 and the baseplate slot 36.

Friction swivel assembly 20 includes a retaining nut 48, a spacer 50, and a router attachment plate 52. Swivel assembly 20 is mounted in baseplate opening 44 and permits the router 12 to rotate about the axis of the opening 44 when the beveling tool 10 is attached to the router 12.

Retaining nut 48 includes a circular, annular flange 54 and a tubular body 56 extending from the flange 54. Flange 54 is sized to fit closely within baseplate counterbore 46 and flush with the datum surface 42. Body 56 has an outer diameter less than the diameter of the baseplate opening 46 and includes an externally threaded end portion 58. Retaining nut 48 is preferably made from HDPE or Teflon.

Spacer 50 has a circular, annular flange 60 and a tubular collar 62. The outside diameter of the collar 62 is closely received within baseplate opening 44. Spacer 50 is preferably made from Ultra-High Molecular Weight plastic (UHMW).

Attachment plate 52 is a flat annular washer or disk preferably machined from aluminum plate. The outer diameter of the attachment plate 52 preferably equals the outer diameter of the baseplate of the router to be attached to the beveling tool 10. The inner wall 64 of the attachment plate 52 is sized and threaded to permit the attachment plate to be threaded onto the retaining nut threaded end portion 58. Countersunk through holes receive screws that attach the attachment plate 52 to the router. Different attachment plates 52 can be provided to adapt the beveling tool 10 for use with other routers or other types of power tools.

Retaining nut 48 is installed in the baseplate 18 with flange 54 within counterbore 46 and body 56 extending through baseplate opening 44. Spacer 50 is fitted on body 56 with spacer collar 60 in baseplate opening 44. Attachment plate 52 with the router 12 attached is threaded onto nut threaded portion 58 and sandwiches the spacer 50 between the plate 52 and the baseplate 18. Router bit 14 is installed in the router 12.

Beveling of an end of a pipe is described next. The router 12 is turned off. The router bit 14 is positioned so that the upper end of the cutting edges of the bit is even with the baseplate surface 42 as shown in FIG. 2. The length of the bushings 32, 36 preferably space the guide rollers 22 and 24 the same distance from the baseplate surface 42 as the bit pilot bearing 16 when the router bit 14 is properly positioned with respect to the baseplate.

Figure 13:
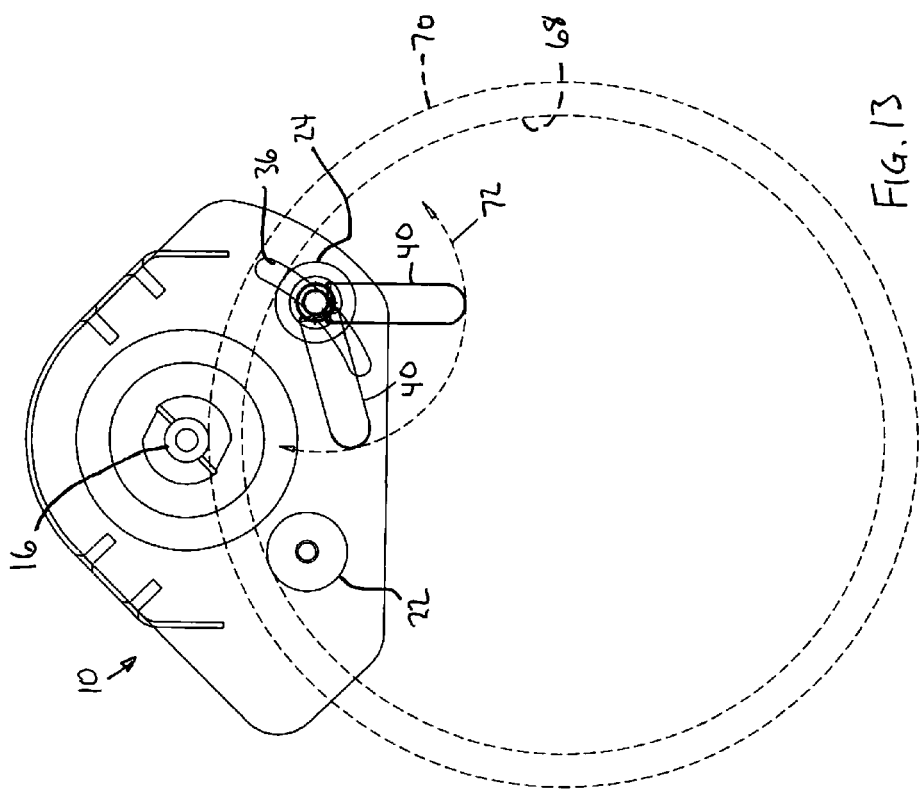
FIG. 13 is a front view illustrating the portable beveling tool mounted on an end of a pipe for beveling the end of the pipe.

Adjustable handle 40 is loosened to enable shaft 34 to move along slot 36. The end of a pipe is placed between the fixed guide roller 22 and the router bit pilot bearing 16 and abuts the stationary, non-rotating router bit 14. The fixed guide roller 22 is placed against the pipe interior wall 68 and the bit pilot 16 is against the pipe outer wall 70. See FIG. 13, in which the interior and exterior pipe walls 68 and 70 are shown as hidden lines. Adjustable guide roller 24 is pressed against the interior pipe wall 68 and handle 40 is tightened by rotation indicated by arc 72 to hold shaft 34 in place with the guide roller 24 against pipe wall 68. The handle 40 is shown in FIG. 13 in both its loosened and clamped positions. The end of the pipe is now against the three circumferentially spaced rollers 16, 22 and 24.

With the beveling tool away from the pipe, router 12 is turned on to rotate the bit 14 at high speed. The end of the pipe is moved against the baseplate datum surface 42. The router bit 14 cuts into the pipe as the end of the pipe moves axially towards the baseplate 18. With the end of the pipe kept against the baseplate 18, the beveling tool 10 is rotated about the outside periphery of the pipe. The end of the pipe is kept against the datum surface 42 and the rollers 16, 22 and 24 remain in contact with the pipe walls to maintain correct alignment of the pipe with the router bit 14 so that the a smooth, accurate bevel is cut at the correct bevel angle. The shield 26 overlays the outside of the pipe across from the router bit 14 to help limit operator exposure to chips or shavings produced by the router bit 14.

The friction swivel assembly 20 permits the router 12 to rotate with respect to the baseplate 18. The retaining nut 48 and the spacer 50 are preferably made of low friction materials to permit relative motion between the baseplate 18 and the attachment plate 52 with low or essentially no drag or frictional resistance. An operator can hold the router 12 and move the beveling tool 10 around the end of a stationary pipe without changing his or her grip on the router 12. The friction swivel assembly 20 enables the beveling tool 10 to rotate with respect to the router 12 as the beveling tool 10 moves around the end of the pipe so that the operator's hands do not have to twist or turn to follow the rotation of the beveling tool 10.

FIG. 13 illustrates beveling tool 10 used in cutting a bevel on the outer pipe wall, that is, the bevel is being cut on the outer diameter of the pipe. The beveling tool would be used essentially rotated 360 degrees as shown in FIG. 13 to locate the rollers on the inside wall of the pipe and the bit pilot on the outside wall of the pipe.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

We claim:

1. A pipe beveling tool for use with a power tool having a cutter that cuts the bevel, the cutter of the type extending along an axis, the pipe beveling tool comprising:
   a base;
   means for locating and guiding the base on an end of a pipe to be beveled;
   a tool mount for mounting the power tool to the base, the tool mount comprising an attachment member configured to be attached to the power tool and first and second connections between the base and the attachment member;
   the first connection a rotatable connection between the base and the attachment member that permits relative rotation of the attachment member with respect to the base about an axis of rotation that is coaxial with the cutter axis when the tool is attached to the attachment member whereby the power tool can rotate with respect to the base as the base moves around an end of a pipe being beveled;
   the second connection preventing relative translation of the attachment member with respect to the base along the axis of rotation whereby the power tool is axially fixed with respect to the base as the base moves around an end of a pipe being beveled.

2. The pipe beveling tool of claim 1 wherein the second connection comprises a threaded connection between the attachment member and the base for selectively locating the attachment member relative to the base along the axis of rotation.

3. The pipe beveling tool of claim 2 wherein the second connection comprises a spacer sandwiched between the base and the attachment member, the threaded connection configured to move the attachment member towards and away from the base whereby different-sized spacers can be sandwiched between the base and the attachment member.

4. The pipe beveling tool of claim 3 wherein the spacer is formed from UHMW plastic.

5. The pipe beveling tool of claim 3 wherein the spacer is formed from UHMW plastic.

6. The pipe beveling tool of claim 2 wherein the base comprises a through opening and a counterbore on one side of the opening; and
   the second connection comprises a nut received in the counterbore and extending through the opening to an end portion spaced from the other side of the opening, and the threaded connection comprises a first set of threads on the end portion of the nut.

7. The pipe beveling tool of claim 1 wherein the means for locating and guiding the base comprise a plurality of rollers extending away from the base.

8. The pipe beveling tool of claim 1 wherein the base comprises a first opening, the first connection is mounted in the first opening and comprises a second opening, and the attachment member comprises a third opening, the pipe beveling tool configured such that the cutter extends through the first, second, and third openings when the pipe beveling tool is attached to the power tool.

9. The pipe beveling tool of claim 1 wherein the first connection comprises a friction swivel assembly.

10. The pipe beveling tool of claim 1 wherein the base has a flat side that faces a pipe being beveled and the axis of rotation of the first connection is perpendicular to the first side of the base.

11. A pipe beveling tool for use with a power tool having a cutter that cuts the bevel, the pipe beveling tool comprising:
    a base;
    means for locating and guiding the base on an end of a pipe to be beveled;
    a tool mount for mounting the power tool to the base, the tool mount comprising an attachment member configured to be attached to the power tool and a rotatable connection between the base and the attachment member that permits relative rotation of the power tool with respect to the base whereby the power tool can rotate with respect to the base as the base moves around an end of a pipe being beveled;
    the rotatable connection comprising a threaded connection between the attachment member and the base; and
    a spacer between the base and the attachment member, the threaded connection configured to move the attachment member towards and away from the base whereby the spacer can be sandwiched between the base and the attachment member.

12. A pipe beveling tool for use with a power tool having a cutter that cuts the bevel, the pipe beveling tool comprising:
    a base;
    means for locating and guiding the base on an end of a pipe to be beveled;
    a tool mount for mounting the power tool to the base, the tool mount comprising an attachment member configured to be attached to the power tool and a rotatable connection between the base and the attachment member that permits relative rotation of the power tool with respect to the base whereby the power tool can rotate with respect to the base as the base moves around an end of a pipe being beveled;
    the rotatable connection comprising a threaded connection between the attachment member and the base; and
    the base comprising a through opening and a counterbore on one side of the opening; and
    the rotatable connection comprising a nut received in the counterbore and extending through the opening to an end portion spaced from the other side of the opening, a first set of threads of the threaded connection on the end portion of the nut.

13. pipe beveling tool for use with a power tool having a cutter that cuts the bevel, the pipe beveling tool comprising:

a base;

means for locating and guiding the base on an end of a pipe to be beveled;

a tool mount for mounting the power tool to the base, the tool mount comprising an attachment member configured to be attached to the power tool and a rotatable connection between the base and the attachment member that permits relative rotation of the power tool with respect to the base whereby the power tool can rotate with respect to the base as the base moves around an end of a pipe being beveled;

the base comprising a first opening, the rotatable connection is mounted in the first opening and comprising a second opening, and the attachment member comprising a third opening, the pipe beveling tool configured such that the cutter extends through the first, second, and third openings when the pipe beveling tool is attached to the power tool.

* * * * *